March 2, 1965     A. L. DANEHY     3,171,182
FASTENER
Filed May 13, 1963
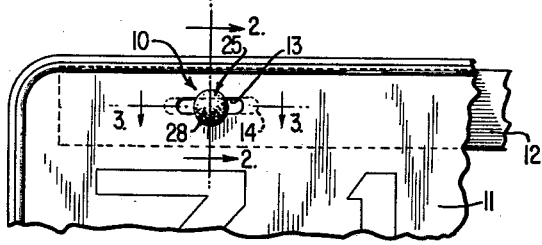
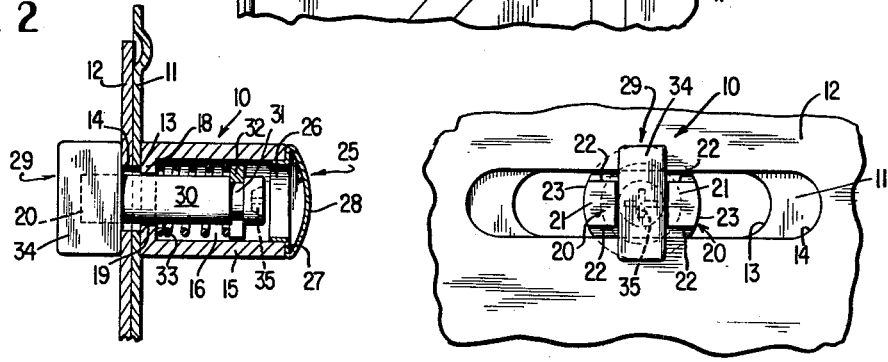
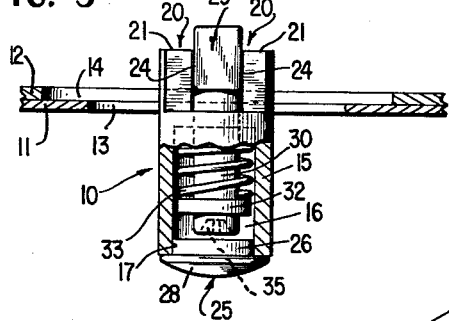
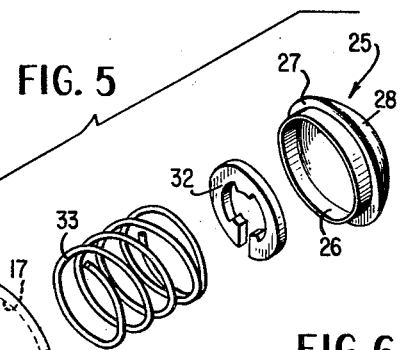
INVENTOR.
ALOYSIUS L. DANEHY
BY
*Sherman Levy*
ATTORNEY

United States Patent Office 3,171,182
Patented Mar. 2, 1965

3,171,182
FASTENER
Aloysius L. Danehy, 4725 Idlewild Court, Peoria, Ill.
Filed May 13, 1963, Ser. No. 280,014
2 Claims. (Cl. 24—221)

This invention relates to a fastener or coupling, and more particularly to a fastener for connecting members together such as for connecting a license plate to a supporting bracket.

The primary object of the present invention is to provide a fastener which can be readily moved to locked or unlocked position, and wherein with the fastener in locked position, accidental or inadvertent turning or unlocking thereof will be prevented.

A further object of the present invention is to provide a fastener for connecting members or elements together, wherein there is provided a spring member for maintaining the proper tension on the parts in order to keep the parts in their proper assembled position, and wherein the present invention can be used for different purposes or applications such as for connecting license plates to supporting brackets, or else it can be used for connecting together other types of members as desired or required.

Still another object is to provide such a fastener that is economical to manufacture and efficient in operation and which is rugged in structure and foolproof in use.

These and other objects of the invention will become apparent from a reading of the following specification and claims, together with the accompanying drawings, wherein like parts are referred to and indicated by like reference characters and wherein:

FIG. 1 is a fragmentary elevational view illustrating the fastener of the present invention being used for connecting or fastening a license plate to a supporting bracket.

FIG. 2 is an enlarged sectional view taken on the line 2—2 of FIG. 1.

FIG. 3 is a sectional view taken on the line 3—3 of FIG. 1.

FIG. 4 is a view looking at the opposite end from FIG. 1 and showing the device in locked position.

FIG. 5 is a perspective view showing the parts separated for clarity of illustration.

FIG. 6 is a view similar to FIG. 2 but illustrating a modification.

Referring in detail to the drawings, and more particularly to FIGS. 1 through 5 of the drawings, the numeral 10 indicates the fastener or coupling of the present invention which can be used for connecting together various members, and for example the fastener 10 can be used for connecting the license plate 11 to its supporting bracket 12 as shown in FIG. 1, and wherein the license plate 11 and bracket 12 are adapted to have registering elongated slots 13 and 14 therein.

As shown in FIG. 5 for example, the fastener 10 comprises a housing or barrel which is indicated generally by the numeral 15, and the housing 15 is of generally cylindrical formation and has a hollow interior 16, and the housing 15 has an open end portion 17 as well as an inwardly directed circular flange portion 18 which is provided with a centrally disposed circular aperture 19 therein.

The numeral 20 designates each of a pair of similar diametrically opposed lugs, and the lugs 20 are arranged in spaced parallel relation with respect to each other and these lugs 20 are integral with the flange portion 18. The lugs 20 have their outer end portions 21 flat and the flat outer end portions 21 are coplanar with respect to each other. The lugs 20 further include flat side portions 22, as well as arcuate outer edge portions 23 which are aligned with the contiguous outer edge portion of the housing 15. The lugs 20 are shaped to include spaced parallel flat inner edge portions 24 which are substantially tangent to portions of the inner edge of the flange 18.

The numeral 25 indicates a closure or cap which is shown to comprise a cylindrical section 26 that projects into the open end portion 17 of the housing 15, and the closure 25 further includes a flat section 27 which abuts the adjacent end of the housing 15, and the closure 25 also includes a rounded main body portion 28.

The numeral 29 indicates a slide, and as shown in the drawings the slide 29 consists of a cylindrical pin portion 30 which may have an annular groove 31 therein, and a retainer or snap washer 32 is adapted to be arranged in engagement with the groove 31. The numeral 33 indicates a spring member which is circumposed on the pin portion 30, and the spring member 33 is interposed between the washer or retainer 32 and the flange portion 18 of the housing 15. The slide 29 further includes a generally rectangular bar portion 34 that is integral with an end of the pin portion 30, and the bar portion 34 has a length which is substantially equal to the outside diameter of the housing 15. By moving the slide 29 so that the longitudinal axis of the bar portion 34 is parallel with the longitudinal axes of the slots 13 and 14, the slide 29 can move through the slots 13 and 14. Similarly by arranging the slide 29 so that its bar portion 34 has its longitudinal axis at right angles to the longitudinal axes of the slots 13 and 14, due to the provision of the spring member 33, sufficient holding action will be exerted to prevent unlocking or disassembly of the parts. An end of the pin portion 30 may be recessed or provided with a kerf as at 35 so that a tool such as a suitable screw driver can be arranged in engagement with the recess or kerf 35, as for example with the closure 25 removed from the housing 15, whereby such a tool can be used for turning the slide 29 to the desired position or location.

Referring now to FIG. 6 of the drawings, there is illustrated a modification, and wherein in FIG. 6 the modified fastener is indicated generally by the numeral 10' and includes the housing 15 which has the same construction as previously described. However the fastener 10' includes a slide 29' that is different from the previously described slide 29. The slide 29' includes a pin portion 30' which has an end 36 flared outwardly or peened over, and the spring member 33 is circumposed on the pin portion 30', and the spring member 33 is interposed between the outwardly flaring portion 36 and the flange portion 18. Thus, with the slide 29', there is no need to have a groove such as the groove 31 and the washer 32 since the outwardly peened portion 36 suffices to maintain the spring 33 in its proper position. Otherwise the construction and use of the fastener 10' are generally the same as that described in connection with the previously described fastener 10.

As shown in the drawings the width of the bar portion 34, that is the distance from one side surface 37 to the opposite side surface 37 of the bar portion 34 is slightly less than the distance between the opposed inner flat faces 24 of the lugs 20. Also the height of the bar portion 34, that is the distance between the surfaces or edges 38 and 39 of the bar portion is of a dimension so that with the parts in the position of FIG. 2, for example, the bar portion 34 will protrude or extend slightly beyond the outer ends of the lugs 20 in order to help insure that there will be a firm and proper locking action exerted.

From the foregoing, it will be seen that there has been provided a fastener, and in use with the parts arranged as shown in FIGS. 1 through 5, the fastener 10 can be used for fastening together various articles or members, and while the present invention has been illustrated and described specifically for use in connecting a license plate to its supporting holder or bracket, it is to be understood that the present invention is not limited to such use so that it can be used wherever such a fastener is needed or required.

When using the fastener 10, the parts are adapted to be arranged as shown in FIGS. 1 through 4 when the fastener is in locked position so that the spring 33 will cause sufficient pressure to be exerted on the slide 29 whereby the bar portion 34 will coact with the flange portion 18 to clamp the license plate 11 and bracket 12 therebetween. In this locking position, the bar portion 34 is snugly held or received between the opposed flat edge portions 24 of the lugs 20, and the bar portion 34, in locking position, is arranged so that its longitudinal axis is at right angles to the longitudinal axes of the slots 13 and 14 as shown in FIG. 4 whereby the fastener will not become loose from its proper position. The closure 25 is held in place on the ends of the housing 15 by means of a friction or snug fit, and the closure 25 may have its outer surface coated or otherwise provided with a light reflecting substance. The closure 25 can be pried loose from the housing 15 so that for example a tool such as a screw driver can be arranged in engagement with the recess 35 in order to depress the slide 29 against the pressure of the spring 33 whereby the slide 29 can be moved 90 degrees from the position shown in FIG. 4, so that, for example, to move the fastener to unlocked position, it is only necessary to move the slide so that its bar portion 34 has its longitudinal axis parallel to the longitudinal axes of the slots 13 and 14 whereby the entire fastener can be disengaged from the slots. The lugs 20 are of a size to permit insertion or withdrawal of the lugs relative to the slots 13 and 14.

In the modification of FIG. 6, the slide 29' has its pin portion 30' provided with the outwardly flared end portion 36 which serves to retain the spring 33 in place so that the modification of FIG. 6 requires fewer parts than the device of FIGS. 1 through 5, inasmuch as certain of the parts such as the groove 31 and washer 32 are eliminated.

The parts can be made of any suitable material and in different shapes or sizes.

The present invention has certain important advantages and for example has an improved locking feature and accidental turning or movement of the parts will be prevented, and the parts can be arranged so that the member 25 and the member 34 can be on either side of the bracket. The spring maintains the proper tension on the plate and bracket, and the device can be used for other purposes besides holding the license plates in place. It can be made of metal, plastic or the like, and the parts can be made out of brightly colored material if desired to enhance the attractiveness thereof. The spring can be assembled on the shaft or pin either by welding, bonding or the like. To hold the spring in place, the snap fastener 32 can be used, or the end of the pin can be peened over as shown in FIG. 6, or a welded arrangement can be utilized. The device can be used on brackets with round holes, as for example in connection with certain of the later model vehicles that have this type of plate holder.

The present invention can be used for holding various materials together as, for example, it can be used for holding two thin metal plates or pieces of plastic together and it is especially suitable for attaching license plates to a vehicle and it will be seen that the fastener consists of the small cylinder or housing with the plunger or slide inside and the pin portion of the slide extends through the tension spring. The small flat plate or bar 34 on the other end thereof is adapted to be pushed through the slots 13 and 14 and then turned 90 degrees and the spring 33 applies sufficient tension or pressure to hold the parts in their proper location.

The recess 35 can be made to accommodate or receive a tool such as a Phillips screw driver or a flat screw driver or the like. Instead of using the peened end 36, a rivet or threaded assembly can be used.

Minor changes in shape, size and rearrangement of details coming within the field of invention claimed may be resorted to in actual practice, if desired.

What is claimed is:

1. In a fastener for connecting a license plate to a frame wherein the license plate and frame have registering elongated slots therein, said fastener comprising a housing of cylindrical formation and said housing having a hollow interior, said housing having an open end portion, and an inwardly directed circular flange provided with a centrally disposed aperture therein, a pair of diametrically opposed lugs arranged in spaced parallel relation with respect to each other and integral with said flange, said lugs having their outer end surfaces flat and coplanar, and said lugs further having flat side surfaces and arcuate outer surfaces which are co-cylindrical with the contiguous outer portions of the surface of the cylindrical housing, said lugs further having flat inner surfaces which are arranged in spaced parallel relation with respect to each other, a removable closure including a cylindrical section projecting into the open end portion of said housing, said closure further including a flat section that abuts the adjacent end of the housing, and said closure further including a rounded main body portion having light reflecting material thereon, a slide including a cylindrical pin portion extending through said aperture in the flange, said pin portion having an annular groove therein spaced from one end thereof, a retainer arranged in engagement with said groove, and a spring member circumposed on said pin portion, said spring member being interposed between said retainer and flange, said slide further including a rectangular bar portion that is integral with said one end of the pin portion, said bar portion having a length substantially equal to the outside diameter of said housing, the width of said bar portion being slightly less than the distance between the flat inner surfaces of the lugs, the end of said pin portion opposite said one end being recessed to receive a tool such as a screw driver.

2. In a device of the character described, a cylindrical housing having a hollow interior, a closure releasably mounted on an end of said housing, and said closure including a cylindrical section, a flat section, and a rounded main body portion having light reflecting material thereon, said device adapted to be used with members that have registering slots therein, the housing having a flange portion which is contiguous to one of the members, said flange portion having a centrally disposed aperture therein, a pair of diametrically opposed lugs integral with said housing, said lugs having their outer end surfaces flat and coplanar, and said lugs further having flat side surfaces and arcuate outer surfaces, said arcuate outer surfaces being co-cylindrical with the contiguous portions of the surface of the housing, said lugs further including spaced parallel flat inner faces, a movable slide including a cylindrical pin portion having an outwardly flared peened end portion, and a spring member circumposed on said pin portion and interposed between said peened end portion and said flange portion, said slide further including a bar portion which has a length substantially equal to the outside diameter of said housing, the width of the bar portion being slightly less than the distance between the flat inner faces of the lugs, and said slide being mounted so that movement thereof through a path of 90 degrees will lock and unlock the device.

References Cited by the Examiner

UNITED STATES PATENTS

| | | | |
|---|---|---|---|
| 1,540,735 | 6/25 | Kroff | 85—5 X |
| 1,672,333 | 6/28 | Miller | 85—5 |
| 2,327,605 | 8/43 | Ryder | 24—217 X |
| 3,136,017 | 6/64 | Preziosi | 24—221 |

FOREIGN PATENTS

| | | |
|---|---|---|
| 1,026,519 | 2/53 | France. |
| 589,005 | 6/47 | Great Britain. |

DONLEY J. STOCKING, *Primary Examiner.*

M. HENSON WOOD, Jr., *Examiner.*